W. G. MARR.
SPRING WHEEL.
APPLICATION FILED OCT. 16, 1907.
925,005.
Patented June 15, 1909.
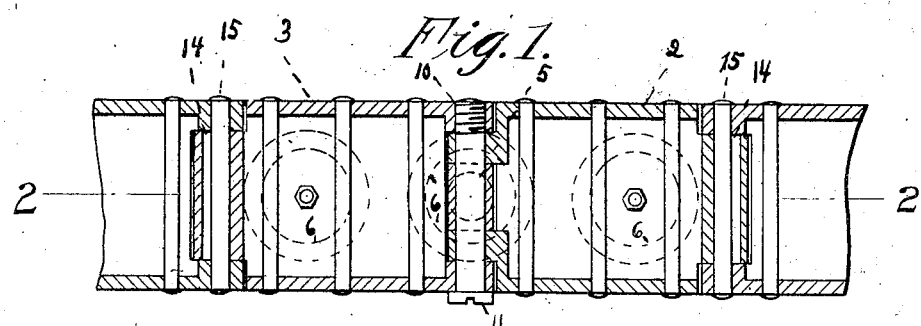
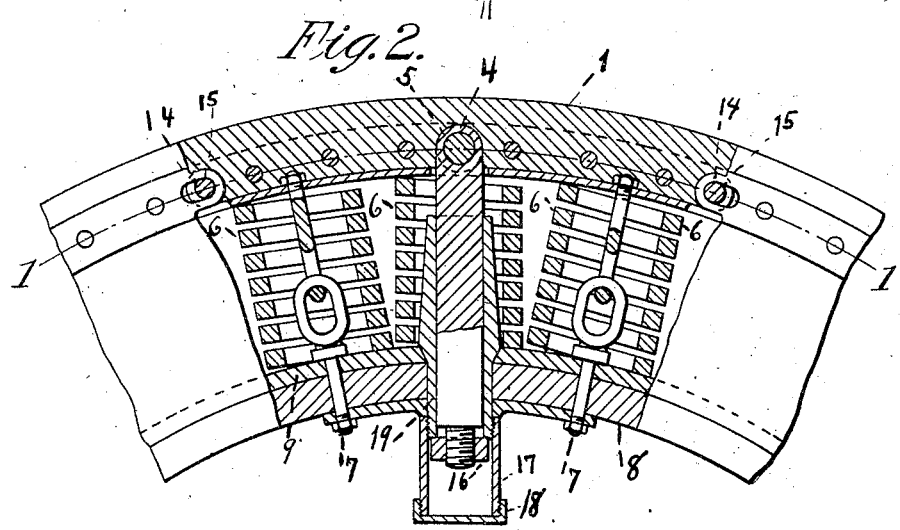
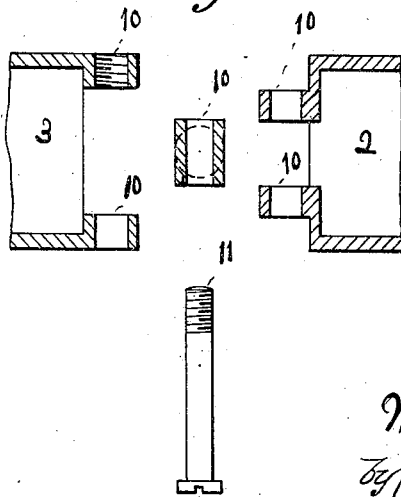
Witnesses:
H. L. Sprague
P. M. Mowry
Inventor:
William G. Marr
by Richard J. Talbot
Attorney

UNITED STATES PATENT OFFICE.

WILLIAM G. MARR, OF NEW BRITAIN, CONNECTICUT.

SPRING-WHEEL.

No. 925,005.  Specification of Letters Patent.  Patented June 15, 1909.

Application filed October 16, 1907. Serial No. 397,643.

*To all whom it may concern:*

Be it known that I, WILLIAM G. MARR, of New Britain, in the county of Hartford and State of Connecticut, have invented certain new and useful Improvements in Spring-Wheels, of which the following is a specification.

My invention relates to improvements in spring wheels and the object of my invention is to produce a wheel with a flexible rim supported by springs.

Figure 1 is a sectional view of the rim at line 1—1 on Fig. 2. Fig. 2 is a longitudinal cross sectional view of a part of the wheel showing the rim sections and plungers attached. Fig. 3 is a view of a part of the rim showing means for attaching the plungers and sections. Fig. 4 is a view of the slot 14. Fig. 5 is another view of the slot 14 showing the same cut away at 12, permitting the sections to be disconnected without removing the pivot 15.

The tire is shown at 1; 2 and 3 represent the rim sections, 4 the plungers, 5 the point of attachment of the plungers and the rim sections, by means of the opening 10 and the bolt 11; 6 represents the coiled springs; 7 a stop which is attached to each of the rim sections; 8 represents the felly of the wheel and 9 a band of metal supporting the springs.

19 represents a detachable support for the plunger, 17 a detachable cup having a detachable end 18, and 16 a stop which may be dispensed with if desired, as the support afforded by the attachment of the rim sections together will hold the parts in position. The rim sections 2 and 3 are attached to the plunger 4 by means of pivots and are hinged upon the plunger, the ends of the rim sections are attached together by means of the elongated hole 14 and a pivot 15 or the equivalent.

The stop 7 is so arranged as to prevent the action of the springs from forcing the rim sections out of position. As is clearly illustrated in Fig. 2, this stop comprises a pair of looped members having limited movement toward and from each other after the manner of the links of a chain. It is apparent therefore, that when these links have reached their limit of movement away from each other, they limit further movement of the outer rim away from the inner rim. The construction of this stop, as shown in the drawing may be changed and it is apparent that a chain or the equivalent may be substituted.

Having thus described my invention what I claim as new and desire to secure by Letters Patent is:

1. A vehicle wheel comprising an inner rim and an outer rim composed of a plurality of sections pivotally connected to each other in such manner as to permit endwise movement of said sections with relation to each other, plungers pivotally connected to some of said sections, a guide for said plunger carried by the inner rim, a plurality of flexible members connecting the inner and outer rims and limiting the outward movement of the outer rim with relation to the inner rim, and resilient members bearing between the inner and outer rims.

2. A vehicle wheel comprising an inner rim and an outer rim composed of a plurality of sections pivotally connected to each other in such manner as to permit endwise movement of said sections with relation to each other, plungers pivotally connected to some of said sections, a guide for said plunger carried by the inner rim, a plurality of flexible members connecting the inner and outer rims and limiting the outward movement of the outer rim with relation to the inner rim, and resilient members bearing between the inner and outer rims, some of said resilient members surrounding the plungers and other of said resilient members surrounding the flexible members.

In testimony whereof I have affixed my signature, in presence of two witnesses.

WILLIAM G. MARR.

Witnesses:
R. M. MOWRY,
C. L. WATSON.